United States Patent [19]
Richardson et al.

[11] Patent Number: 5,812,126
[45] Date of Patent: Sep. 22, 1998

[54] METHOD AND APPARATUS FOR MASQUERADING ONLINE

[75] Inventors: John W. Richardson, Portland; Robert T. Adams, Lake Oswego; Vaughn S. Iverson, Beaverton, all of Oreg.

[73] Assignee: Intel Corporation, Santa Clara, Calif.

[21] Appl. No.: 775,411

[22] Filed: Dec. 31, 1996

[51] Int. Cl.$^6$ ........................................... G06F 3/00
[52] U.S. Cl. ..................... 345/330; 704/2; 395/200.34
[58] Field of Search ................... 345/326–358; 704/1–10; 395/200.34–200.37

[56] References Cited

U.S. PATENT DOCUMENTS

| | | | |
|---|---|---|---|
| 4,805,222 | 2/1989 | Young et al. | 382/2 |
| 4,903,218 | 2/1990 | Longo et al. | 345/332 |
| 5,257,306 | 10/1993 | Watanabe | 345/330 X |
| 5,488,686 | 1/1996 | Murphy et al. | 345/330 |
| 5,491,743 | 2/1996 | Shiio et al. | 345/330 X |
| 5,659,691 | 8/1997 | Durward et al. | 345/329 |
| 5,732,232 | 3/1998 | Brush, II et al. | 345/329 X |
| 5,736,982 | 4/1998 | Suzuki et al. | 345/330 |

OTHER PUBLICATIONS

"Prediction And Conversational Momentum In An Augmentative Communication System", Norman Alm, John L. Arnott and Alan F. Newell, Communications of the ACM, vol. 35, No. 5, May 1992, pp. 48–57.

*Primary Examiner*—John E. Breene
*Attorney, Agent, or Firm*—Blakely, Sokoloff, Taylor & Zafman

[57] ABSTRACT

A method and apparatus for masquerading online is provided. A user supplies one or more transformation factors by selecting aspects of a stored user profile or by specifying desired attributes directly. The transformation factors are subsequently used to disguise the user's identity by generating suggested masqueraded output or by altering the user's input based upon the transformation factors. User input is received that is to be transmitted. The user input is then transformed into a masqueraded user output. The resulting masqueraded user output conforms to the transformation factors while maintaining the same basic meaning as the original user input. The masqueraded user output is then transmitted in place of the original user input.

23 Claims, 3 Drawing Sheets

METHOD AND APPARATUS FOR MASQUERADING ONLINE

RELATED APPLICATIONS

A copending U.S. patent application, <Attorney Docket No. P4102>, filed <filing date>, by John W. Richardson, et al., and titled "METHOD AND APPARATUS FOR ANALYZING ONLINE USER TYPING TO DETERMINE OR VERIFY FACTS," is hereby incorporated by reference.

FIELD OF THE INVENTION

The invention relates generally to the field of online communications in multi-user environments. More specifically, the invention relates to transforming a user's online typing to conform to user specified attributes.

BACKGROUND OF THE INVENTION

Linguists have observed that many characteristics of a speaker are communicated through unconscious choices of style and diction. These characteristics include, among others, gender, age, educational level, and where the speaker was raised. The markers for these characteristics can also be found in a person's written communication. For example, men and women are carrying over socialized speech patterns into their online communications. Continued communication, therefore, allows a person to make conscious or unconscious decisions about the characteristics of another person with whom they are interacting.

In chat rooms and in real life (IRL), this automatic determination of characteristics has the potential to lead to a general disregard of viewpoints presented by lesser valued speakers. This is so because once characteristics have been attributed to a person, all subsequent information received from that person is filtered through these assumptions. For example, early linguistic research in the area of gender differences suggested that women's speech wasn't as effective as men's because women had a tendency to use certain negatively evaluated forms. More recent linguistic research suggests, however, that often linguistic forms that are negatively evaluated when used by women are sometimes positively evaluated when used by men. Further, linguistic forms that were consistently negatively evaluated were used more often by people of lesser status than by people of greater status.

Internet service providers typically allow participants to identify their name, gender, and age as they wish. Therefore, one possible solution for a person to avoid being prejudged based on their real world characteristics would be to present him/herself as a person having certain characteristics (e.g., age, gender, educational level, etc.) known to be appealing to the target audience and attempt to imitate a person with such characteristics. In addition to avoiding prejudice, users, particularly female users, may wish disguise their identity to avoid unwanted advances from other users. However, posing as a person of the opposite gender, someone of a different generation, or someone with a higher educational level, etc. may be difficult to maintain. It is desirable, therefore, to provide a method and apparatus for transforming a user's input to conform to one or more user supplied characteristics.

SUMMARY OF THE INVENTION

A method and apparatus for masquerading online is disclosed. A masquerade user profile is received. The masquerade user profile corresponds to a person to be impersonated. User input is received that is to be transmitted. The user input is transformed into a masqueraded user output. The resulting masqueraded user output conforms to desired elements of the masquerade user profile while maintaining substantially the same meaning as the original user input. The masqueraded user output is then transmitted in place of the original user input.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for creating output appropriate to a specified masquerade profile is described. Importantly, while most chat areas allow real-time communication among users, this is not an essential characteristic of a chat area for the purposes of this application. The terms "chat room" and "chat area" are used throughout this application to refer to any online environment that allows multi-user interaction. For example, Internet Relay Chat (IRC), multi-user dungeons, multi-user environment simulators (MU*s), habitats, GMUKS (graphical multi-user konversation), and even Internet newsgroups would fall within this definition of a chat room.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

HARDWARE OVERVIEW

Figure 1:
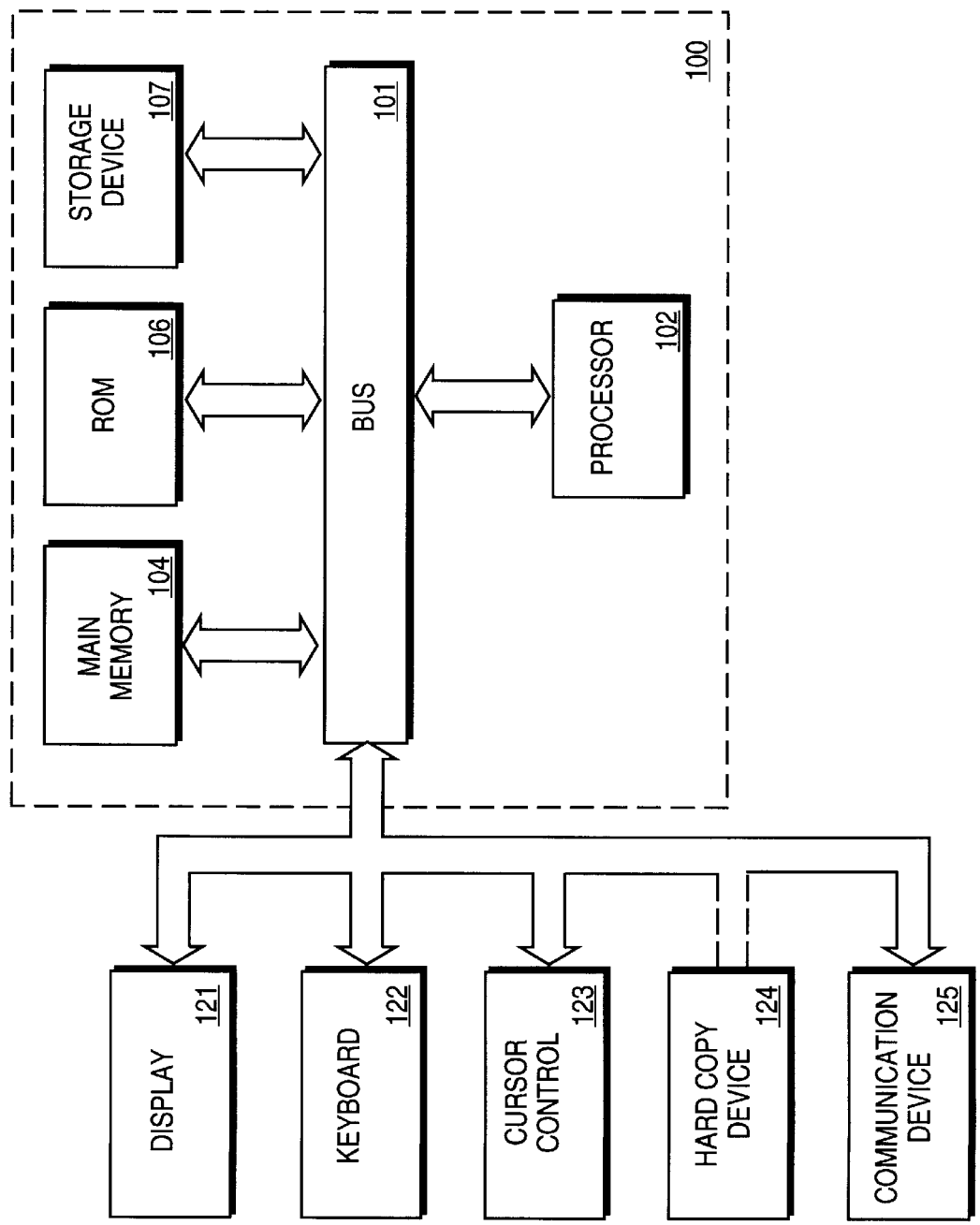
FIG. 1 is an example of a typical computer system upon which one embodiment of the present invention can be implemented.

Referring to FIG. 1, a computer system is shown as 100. The computer system 100 represents a computer system upon which the preferred embodiment of the present invention can be implemented. Computer system 100 comprises a bus or other communication means 101 for communicating information, and a processing means 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions. A data storage device 107 such as a magnetic disk or optical disc and its corresponding drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane. Alternatively, other input devices such as a stylus or pen can be used to interact with the display. A hard copy device 124 which may be used for printing instructions, data or other information on a medium such as paper, film, or similar types of media can be coupled to bus 201. A communication device 125 may also be coupled to bus 101 for use in accessing other computer systems. The communication device 125 may include any of a number of commercially available networking peripheral devices such as those used for coupling to an Ethernet, token ring, Internet, or wide area network. Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation.

The present invention is related to the use of computer system 100 for transforming a local user's text input into output conforming to a specified user profile. In one embodiment, computer system 100 executes a program that alters information provided by a local user to create output seemingly produced by a user meeting a specified user profile.

Figure 2:
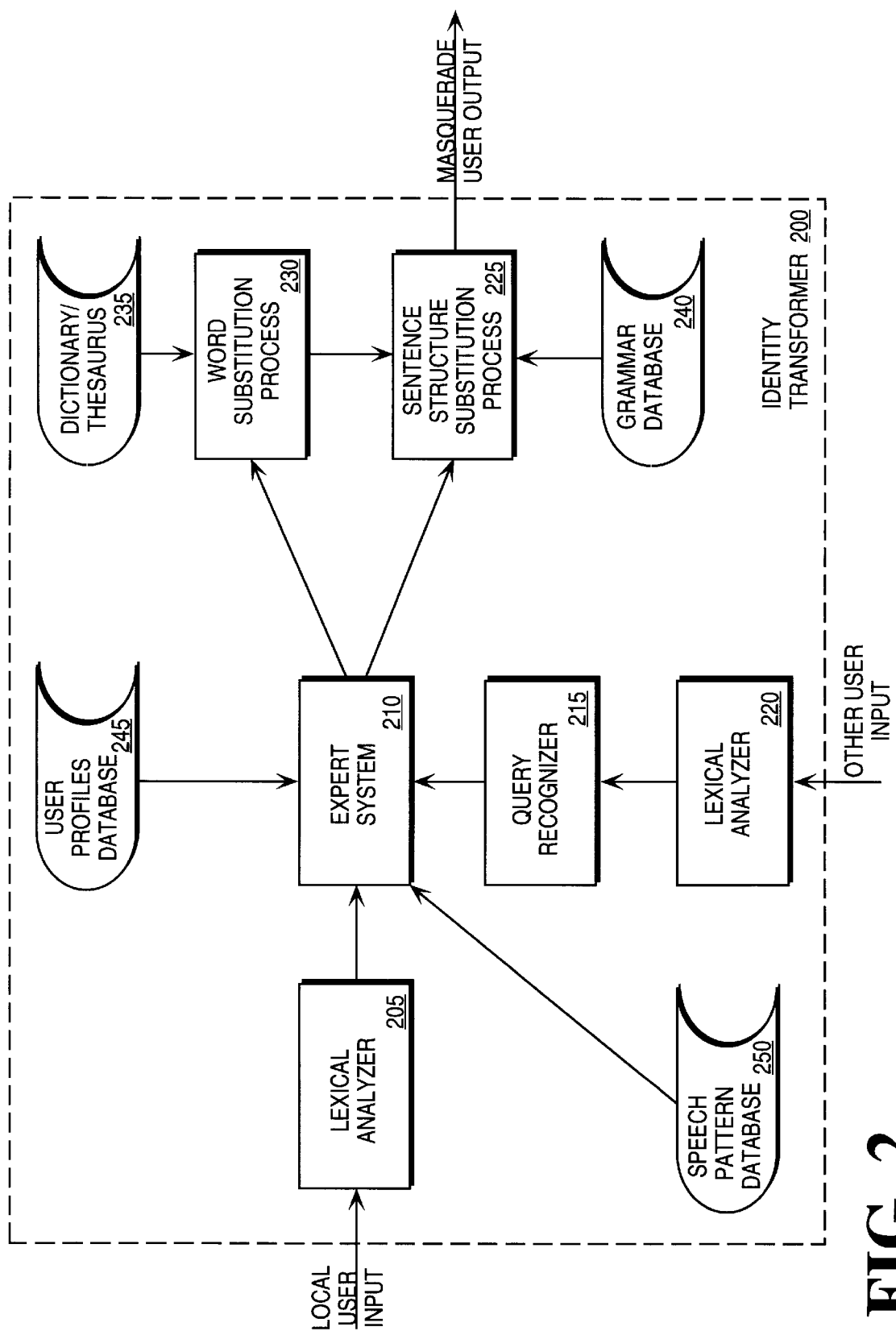
FIG. 2 illustrates the overall software architecture of an identity transformer according to one embodiment of the present invention.

FIG. 2 illustrates the overall software architecture of an identity transformer according to one embodiment of the present invention. Identify transformer 200 includes a pair of lexical analyzers 205 and 220, an expert system 210, a query recognizer 215, a word substitution process 230, a sentence structure substitution process 225, a dictionary/thesaurus 235, a grammar database 240, a speech pattern database 250, and a user profiles database 245.

The identify transformer 200 accepts user input in the form of a text message and transforms the user input into masqueraded user output. The masqueraded output represents a text message having the same basic meaning of the input text message; however, the speech patterns are modeled after another user's profile.

Lexical analyzer 205 receives text based messages from the local user and prepares the character stream for processing by the expert system 210.

The expert system 210 directs the processing of the word substitution process 230 and the sentence structure substitution process 225 based upon transformation factors provided by the user. The transformation factors can be provided, for example, in the form of a user profile from the user profiles database 245, a subset of characteristics from a given user profile, or characteristics can be provided directly without reference to a user profile. In this manner, the user can choose to transform his/her input to emulate a specific person, only specific characteristics of a specific person, or specified characteristics without reference to a particular person.

The word substitution process 230 alters the local user's input by substituting words appropriate for the specified user profile. The word substitution process uses the dictionary/thesaurus 235 to find appropriate substitutions based upon the direction from the expert system 210. Other substitutions can also be made to make an impersonation more convincing. For example, if the user to be impersonated frequently employs abbreviations or acronyms such as the "Net abbreviations" discussed above, the phases in the input stream can be replaced by the appropriate abbreviations/acronyms. Also, if the impersonated user is a fan of emoticons, "smileys" can be generously distributed throughout the masqueraded output.

The sentence structure substitution process 225 receives sentences written by the local user and alters the sentence structure. In accordance with input from the expert system 10, the local user's sentences are converted into more or less complicated sentence structures with reference to the grammar database 240. Sentences produced by the structure substitution process 225 can make the masquerading more convincing if appropriate speech patterns for the specified transformation factors are also employed. Speech patterns are accessible for a given characteristic from the speech pattern database 245. Of course, the expert system 210 should direct both the word substitution process 230 and the sentence structure substitution process 225 in a manner that maintains the same basic meaning as the user's original input.

Lexical analyzer 220 receives other user input from other users in the conversation and processes the text message for the query recognizer 215. The query recognizer 215 signals the expert system 210 when it determines a question has been asked by one of the other users in the conversation.

To improve the response time of the identity transformer 200, in one embodiment, the expert system 210 is capable of producing suggested masqueraded output (e.g., greetings, filler remarks, smalltalk inquiries, suggested responses to queries from the other users, closings, etc.). The suggested masqueraded output is based upon input from the specified user profile and the state of the conversation. In this embodiment, the local user can transmit the suggested masqueraded output, transmit a modified version of the suggested masqueraded output, or key a response of his/her own that will be transformed and output. The process of supplying suggested masqueraded output is described further with respect to FIG. 3.

The user profiles database 245 can be generated from prior contacts with users as described in <Attorney Docket no P4102> or it can be manually generated. In any event, the user profile database 245 preferably includes a statistical profile for each user in the database, conversational constructs employed by the users, and characteristics of each user.

The statistical profile can include metrics and statistics on several variables including: typing speed, typing rhythm, typing patters such as inter-key and inter-word timing differences, common spelling, grammatical and punctuation errors, weak phrasing, frequent use of slang, cliches, long or incomplete sentences, redundant phrases, incorrect verbs, and other factors determined to be important for convincingly masquerading as the desired user. Additionally, usage, choice and frequency of "emoticons" (e.g., smileys), and usage, choice and frequency of "Net abbreviations" such as "IMHO" ("In my humble opinion"), "IRL" ("In real life"), "INAL" ("I'm not a lawyer") can be recorded in a given user profile to facilitate future user identification. Many other variables can be tracked depending upon the complexity and accuracy goals for the system (e.g., word choice, breadth of vocabulary, length of sentences, references to events or popular icons of a particular era, music, complexity of sentence structure, etc.) Further, it is appreciated that online communication is becoming more and more graphically oriented. Therefore, in an alternative embodiment of the present invention, the user profile database 245 would also include graphic information associated with a user such as avatars, icons, and the like.

The conversational constructs should include at least one or more of the following: frequently used conversational openings, filler comments, typical smalltalk inquiries, and frequently used conversational closings.

The characteristics should include at least the user's gender, age, educational level, and where he/she grew up.

The speech pattern database 250 preferably includes rules, facts, heuristics, etc. based upon observations by linguists in the area of sociolinguistics. The following are exemplary observations about speech patterns that have found much support in researchers and scholars of today: (1) Women more frequently use hedges. For example, phrases like "sort of," "kind of," "It seems like," "loosely speaking", and other phrases that tend to lessen the assertiveness a statement, soften the impact of a statement or phrases such as "I was sort-of-wondering," "maybe if . . . ," "I think that . . . " etc. (2) Women tend to use superpolite/polite forms. For example, women more frequently use the following phrases "Would you mind . . . ," "I'd appreciate it if . . . ," ". . . if you don't mind." Also, women's speech is characterized by a higher frequency of honorifics. (3) Women frequently employ tag questions. For example, phrases like "aren't you?" or "isn't it?" at the end of a statement. (4) Men tend to use "I" more. (5) Men tend to cuss more. (6) Men tend to use more imperatives. (6) Women tend to deflect compliments. (7) Women tend to use more terms of endearment. (8) To establish camaraderie, men tend to use sarcasm and put-downs jokingly, whereas women tend to take these "jokes" as personal insults. In contrast, women tend to establish camaraderie by trading personal details about their life. (9) Women tend to use indirect communication. (10) Women more frequently preface their ideas with conditionals like "I'm not saying we have to do this, but maybe we could . . . " "I'm just brainstorming here . . . " "I don't know if this will work, but . . . " "I'm no expert on this, but maybe . . . " "This is a really dumb question, but . . . " (11) Men use more obscenities. (12) Women use empty adjectives more often (e.g., divine, lovely, adorable, etc.) (13) Women tend to use what is considered the better, or prescriptive, form of grammar and pronunciation. Experts have attributed this to the fact that children tend to adopt the language of their primary care-giver, so women, being potential moms and representing the majority of teachers, may feel an unspoken responsibility to know and use so-called "good English." (14) Men paraphrase more often, while women more frequently use direct quotation. (15) Both men and women develop special lexicons. For example, women use more words and details for things like colors (e.g., teal instead of green, bone instead of white), whereas men use more words and details for things like sports.

These and other observations can be used to generate rules for directing the word substitution process 230 and the sentence structure substitution process 225.

In a similar manner, variables, rules and metrics can be generated for mimicking speech patterns of a person from a particular region. For example, regional phrases and colloquialisms can be stored in a database and sprinkled throughout a conversation.

Figure 3:
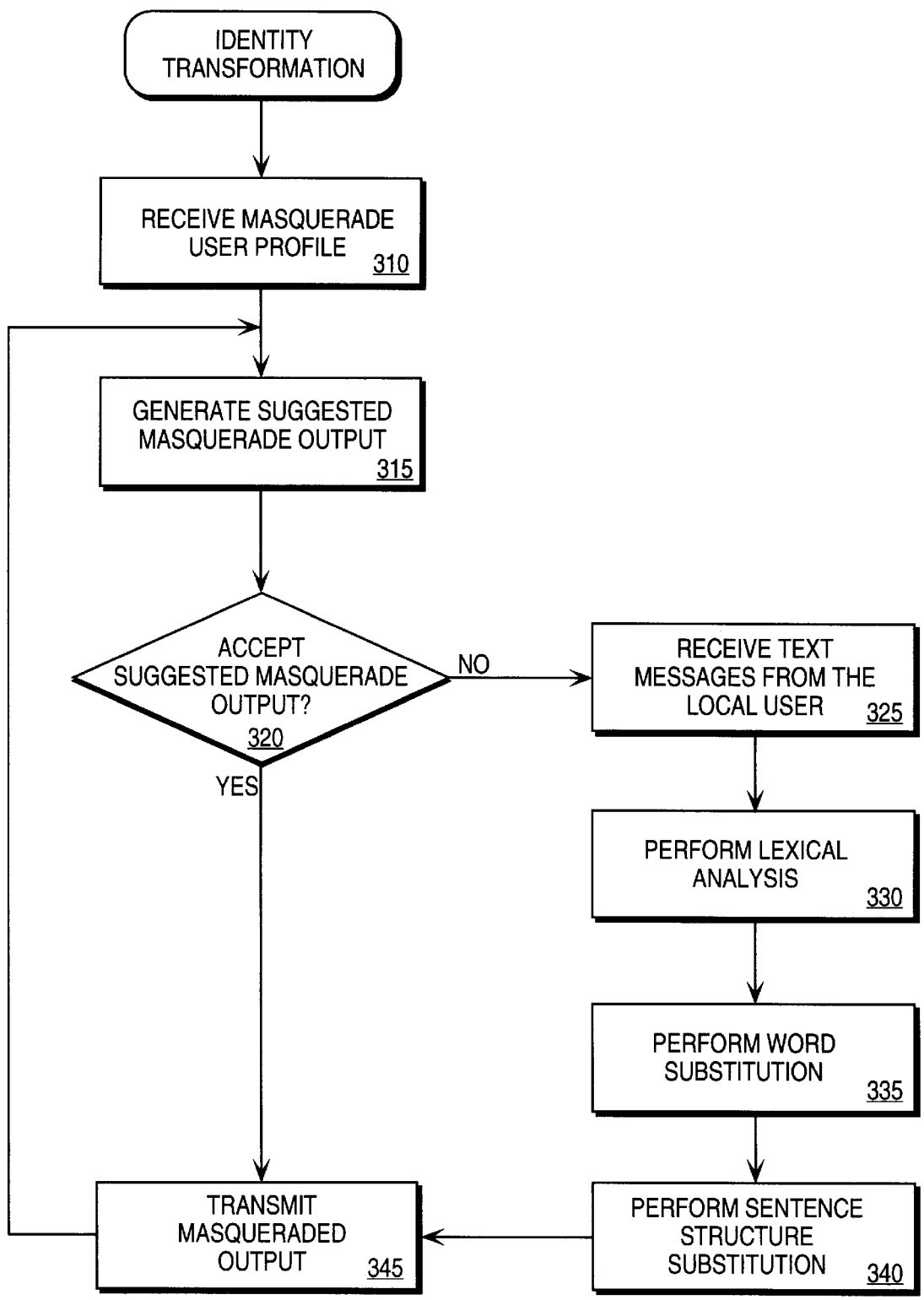
FIG. 3 is a flow diagram illustrating a method of identify transformation according to one embodiment of the present invention.

FIG. 3 is a flow diagram illustrating a method of identify transformation according to one embodiment of the present invention.

At step 310, the identity transformer receives a masquerade user profile from the local user. The local user specifies which of the user profiles in the user profiles database he/she desires the identity transformer to emulate. The local user may optionally choose to emulate only specific characteristics of the desired user. For example, the local user can command the identity transformer to emulate only the desired user's educational level. Accordingly, the identity transformer would modify the local user's input only to conform it to the educational level of the desired user.

Alternatively, the local user may provide characteristics directly without reference to a stored user profile.

At step 315, the identity transformer 200 generates a suggested masquerade output. The suggested masqueraded output can be generated, for example, with reference to a transition network. The transition network would include states that represent stages a conversation can reach and each state would be linked to one or more other states based upon the completion of a particular conversational event. At the most simple, abstract level a complete conversation can be said to have the following three components: an opening of the conversation; topic discussion; and a closing of the conversation. People tend to use a predictable routine in opening a conversation. The process of opening a conversation can typically be broken down further into the following elements: bid for attention; verbal salute; identification; personal inquiry; and smalltalk. As in the case of opening a conversation, people tend to follow set procedures for closing a conversation. Basic elements identified in the process of closing a conversation include the following: transition signals; exchange of phatic remarks, and exchange of farewells. Recognizing this predictability of conversations allows the expert system 210 to generate suggested masqueraded output during the opening and closing of conversation. Further, filler information can be provided based upon stock phrases frequently employed by the desired user (e.g., smalltalk inquiries, filler remarks, etc.). These filler phrases are available from the desired user's profile.

The expert system 210 keeps track of the current conversational state and transitions between the states based upon the happening of certain events (normally the completion of a speech act). For example, from the starting state, the conversational state might transition to the topic discussion state upon the completion of a bid for attention, a verbal salute, or a response to another's personal inquiry. The suggested masquerade output is based upon input received from other users in the conversation and/or the current conversational state (e.g., greeting, respond to greeting, etc.). Given the current conversational state, for example, a frequently used conversational construct can be extracted from the desired user's profile.

At step 320, the local user either accepts the suggested masqueraded output or composes a message of his/her own. If the local user chooses to make use of the suggested masqueraded output, then processing continues at step 345. However, if the local user rejects the suggested masqueraded output in favor of his/her own creation, then processing resumes at step 325.

Alternatively, instead of the local user having to accept or reject the suggested masqueraded output as a whole, the identify transformer 200 could be configured to allow the local user to modify the suggested masqueraded output.

After selecting the desired user's profile, the local user can begin composing messages. At step 325, a text message is received from the local user. Importantly, at this stage, the conversational constructs, statistical characteristics, and speech patterns observable in the text message are those of the local user.

At step 330, lexical analyzer 205 performs lexical analysis on the received message. Lexical analysis typically includes scanning the input character stream and grouping the characters into tokens (e.g., words, punctuation, white space, numbers, etc.).

The expert system 210 directs the word substitution process 230 by supplying parameters indicating the type of word substitution required (e.g., lower educational level, higher educational level, more assertive, less assertive, misspelling, etc.). These substitution parameters are based upon the characteristics of the desired user and the corresponding speech patterns indicated by the speech pattern database 250. Upon receiving direction from the expert system 210, the word substitution process 230 performs the requested word substitution, step 335. If, for example, the local user has chosen to masquerade as a user with a higher amount of education, the word substitution process 230 would use the dictionary/thesaurus 235 to replace the presumably monosyllabic words in the input stream with multisyllabic synonyms.

At step 340, the sentence structure substitution process 225 performs the necessary sentence structure substitution. Depending on the characteristics of the desired user and the speech patterns that are associated with those characteristics, the expert system directs specific sentence structure changes. Again, assuming the local user has chosen to masquerade as a user with a higher amount of education, more syntactically complex sentence structures would be substituted for the presumably simplistic phases in the input stream. Also, colloquial phrases suitable to a specific college could be inserted into the masqueraded output, or whatever else the desired user's profile called for.

Well known formulas can also be used to assure the sentences produced are the appropriate reading complexity relative to the desired user's age and education. Exemplary formulas used to analyze a writing's readability include the Flesch Reading Ease, Gunning Fog Index, and the Flesch-Kincaid Grade Level.

The Flesch Reading Ease formula produces lower scores for writing that is difficult to read and higher scores for text that is easy to read. The Flesch Reading Ease score is determined as follows: 206.835−(1.015(Average sentence length)+846(Number of syllables per 100 words)). A text scoring 90 to 100 is very easy to read and rated at the 4th grade level. A score between 60 to 70 is considered standard and the corresponding text would be readable by those having the reading skills of a 7th to 8th grader. A text generating a score between 0 and 30 is considered very difficult to read and is recommended for college level readers.

The Gunning Fog Index also gives an approximate grade level a reader must have completed to understand a given sample of text using the following formula: 0.04((Average number of words per sentence)+(Number of words of 3 syllables or more)).

The last approach is the Flesch-Kincaid Grade Level. The formula is: 0.39 (Average number of words per sentence)+ 11.8(average number of syllables per word))−15.59.

Using one or more of the above formulas or any of a number of other complexity measurements, the sentence structure substitution process 225 can be directed to enhance the local user's input sentences until the appropriate reading complexity is achieved.

After step 340, the modified text reflects the speech patterns, conversational constructs, and statistical characteristics indicated by the masqueraded user's profile. Finally, at step 345, the modified text, referred to as masqueraded user output, is transmitted to the intended recipient(s). The process can be repeated for the duration of the conversation by proceeding to step 315.

The inventors of the present invention appreciate that online communications can include the presentation and exchange of graphical objects such as avatars and icons. As the usage of graphic objects in online communications grows, convincing masquerading will likely require more than text manipulation. Therefore, in an alternative embodiment, in addition to word substitution and the sentence structure substitution, graphics associated with a user can be retrieved from the user profile database 245 and employed to further the masquerading.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of masquerading online, the method comprising the computer implemented steps of:

receiving a masquerade user profile, the masquerade user profile corresponding to a person to be impersonated;

receiving user input to be transmitted;

transforming the user input into a masqueraded user output, the masqueraded user output conforming to one or more desired elements of the masquerade user profile while maintaining substantially the same meaning as the user input; and transmitting the masqueraded user output in place of the user input.

2. The method of claim 1 wherein the user input is in the form of a text message, and wherein the step of transforming the user input into a masqueraded user output further includes the computer implemented steps of:

performing lexical analysis on the text message; and performing word substitution based on the masquerade user profile.

3. The method of claim 2 wherein the step of transforming the user input into a masqueraded user output further includes the computer implemented step of performing sentence structure substitution based upon the masquerade user profile.

4. The method of claim 3 wherein the step of performing sentence structure substitution further includes the computer implemented step of selecting speech patterns appropriate for the masquerade profile.

5. The method of claim 3 wherein the step of performing sentence structure substitution further includes the computer implemented step of selecting grammar appropriate for the masquerade profile.

6. The method of claim 1 wherein the masquerade user profile contains therein conversational constructs used by the person to be impersonated.

7. The method of claim 1 wherein the masquerade user profile contains therein characteristics of the person to be impersonated.

8. The method of claim 1 wherein the masquerade user profile contains therein a statistical profile of the person to be impersonated.

9. The method of claim 1 wherein the masquerade user profile was generated based upon information received during one or more previous sessions involving the person to be impersonated.

10. The method of claim 6 wherein the conversational constructs include one or more of the following: greetings most frequently used by the person; typical responses used by the person; typical topics of interest of the person; and closings most frequently used by the person.

11. The method of claim 7 wherein the characteristics include one or more of the following: the person's level of education; the person's age; the person's gender; and where the person grew up.

12. The method of claim 8 wherein the statistical profile includes one or more of the following: the person's typing rhythm; colloquialisms used by the person; frequent grammatical errors made by the person; and frequent spelling errors made by the person.

13. An identify transforming apparatus for emulating characteristics of a specific user, the identify transforming apparatus comprising:

a processor configured to transmit and receive text messages; and a memory coupled to said processor, said memory having stored therein a user profiles database; and sequences of instructions which, when executed by said processor, cause said processor to perform the steps of:

receiving a request from a first chat room user to masquerade as a second chat room user;

retrieving a stored user profile from said user profiles database, the stored user profile corresponding to the second chat room user;

receiving a text message from the first chat room user; and transforming the text message into an equivalent text message, the equivalent text message conforming to desired aspects of the second chat room user; and transmitting the equivalent text message.

14. The identify transforming apparatus of claim 13 wherein the sequences of instructions further cause the processor to perform the step of performing word substitution based on the stored user profile.

15. The identify transforming apparatus of claim 13 wherein the sequences of instructions further cause the processor to perform the step of performing sentence structure substitution based upon the stored user profile.

16. The identify transforming apparatus of claim 13 wherein the sequences of instructions further cause the processor to perform the step of selecting speech patterns appropriate for the stored profile.

17. The identify transforming apparatus of claim 13 wherein the sequences of instructions further cause the processor to perform the step of selecting grammar appropriate for the stored profile.

18. A method of masquerading online, the method comprising the computer implemented steps of:

receiving one or more transformation factors from a chat room user;

generating masqueraded output based on the one or more transformation factors, the masqueraded output being in the form of one or more text messages; and transmitting the masqueraded output.

19. The method of claim 18 wherein the step of generating masqueraded output based on the one or more transformation factors further includes the computer implemented steps of:

receiving user input from the chat room user to be transmitted; and transforming the user input into the masqueraded output, the masqueraded output conforming to the one or more transformation factors.

20. The method of claim 18 wherein the step of generating masqueraded output based on the one or more transformation factors further includes generating a suggested masqueraded output based upon the one or more transformation factors, the method further including the computer implemented steps of:

replacing the suggested masqueraded output with masqueraded output produced by conforming user input with the one or more transformation factors if the chat room user rejects the suggested masqueraded output;

modifying the suggested masqueraded output if the chat room user accepts the suggested masqueraded output with modifications; and using the suggested masqueraded output as the masqueraded output if the chat room user accepts the suggested masqueraded output without modifications.

21. The method of claim 18 wherein the one or more transformation factors represent a subset of information collected about another user in a user profiles database.

22. The method of claim 18 wherein the one or more transformation factors are entered directly without reference to a user profile.

23. A machine-readable medium having stored thereon data representing sequences of instructions, said sequences of instructions including sequences of instructions which, when executed by a processor, cause said processor to perform the steps of:

receiving a masquerade user profile, the masquerade user profile corresponding to a person to be impersonated;

receiving user input to be transmitted;

transforming the user input into a masqueraded user output, the masqueraded user output conforming to one or more desired elements of the masquerade user profile; and transmitting the masqueraded user output in place of the user input.

* * * * *

UNITED STATES PATENT AND TRADEMARK OFFICE
CERTIFICATE OF CORRECTION

PATENT NO. : 5,812,126
DATED : September 22, 1998
INVENTOR(S) : Richardson et al.

It is certified that error appears in the above-identified patent and that said Letters Patent is hereby corrected as shown below:

In column 1 at lines 5-9 delete the paragraph beginning with "A copending United States patent application" and insert --Copending U.S. Patent Application Number 08/775,808, entitled "METHOD AND APPARATUS FOR ANALYZING ONLINE USER TYPING TO DETERMINE OR VERIFY FACTS," of John W. Richardson et al., filed on December 31, 1996 and assigned to the assignee of the present invention is hereby incorporated by reference.--

In column 1 at line 55 following "wish" and prior to "disguise" insert --to--

In column 2 at line 24 delete "identify" and insert --identity--

In column 4 at lines 53-54 delete "Attorney Docket no P4102" and insert --copending application number 08/775,808--

Signed and Sealed this

Twenty-ninth Day of December, 1998

*Attest:*

BRUCE LEHMAN

*Attesting Officer*   *Commissioner of Patents and Trademarks*